H. L. FERRIS.
ANIMAL STALL.
APPLICATION FILED MAY 4, 1916.
1,197,194.
Patented Sept. 5, 1916.
3 SHEETS—SHEET 2.
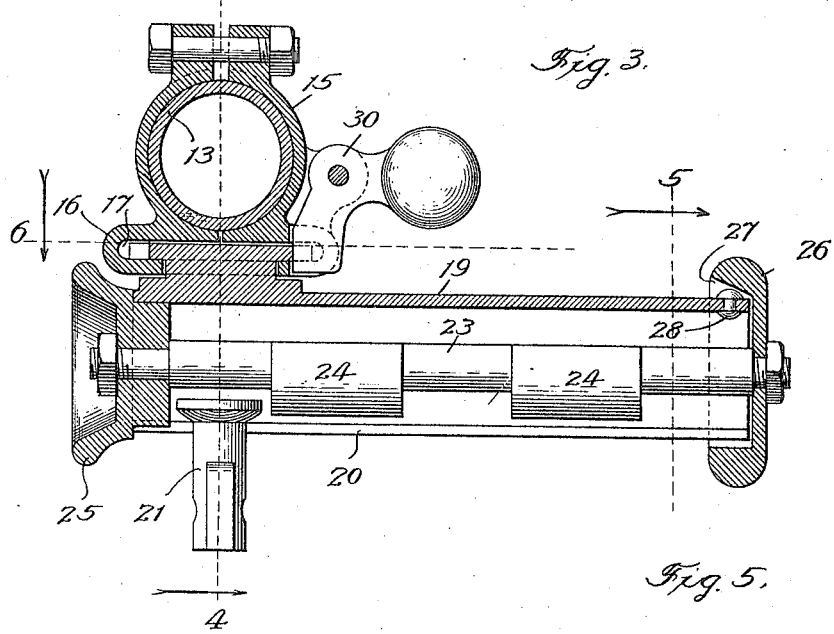
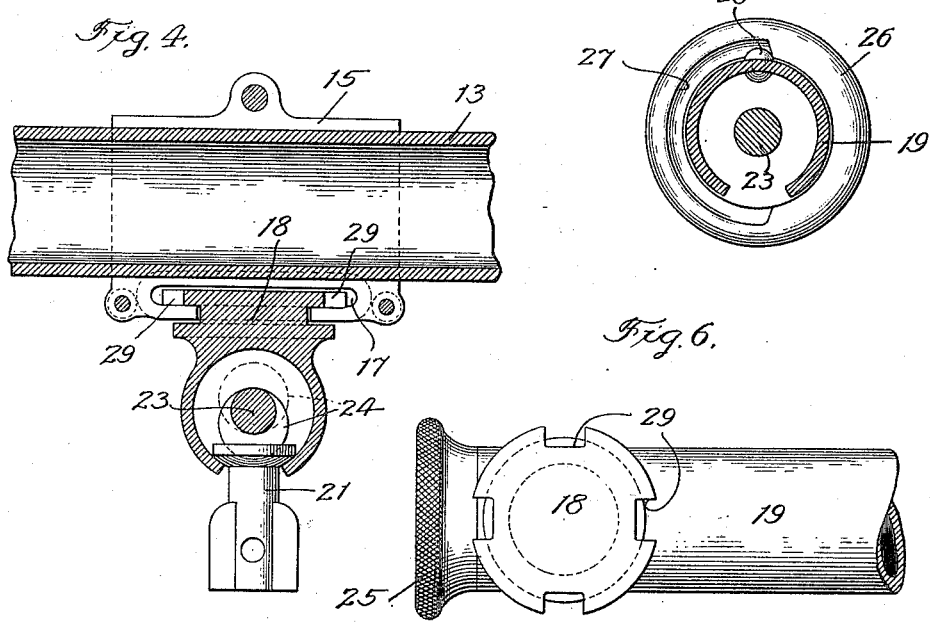
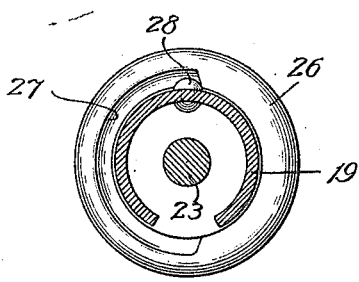
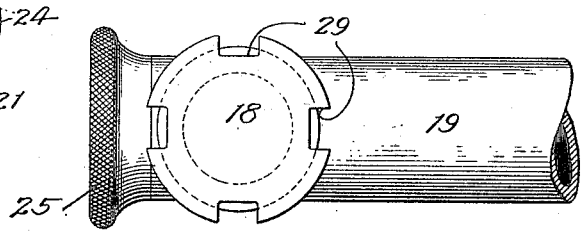
Witnesses:
Inventor:
Henry L. Ferris,
By Dyrenforth, Lee, Chritton and Wiles
Atty's.

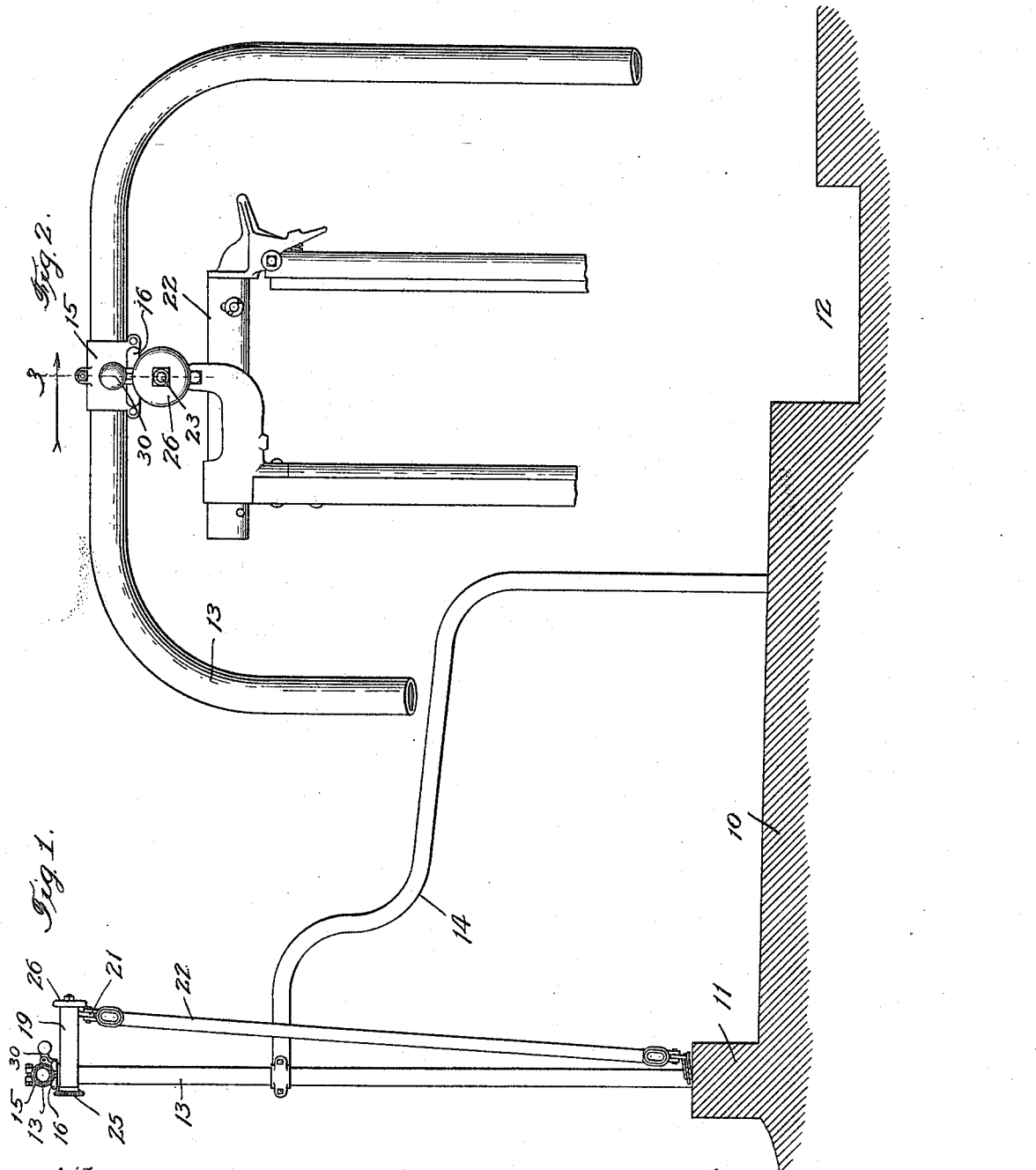

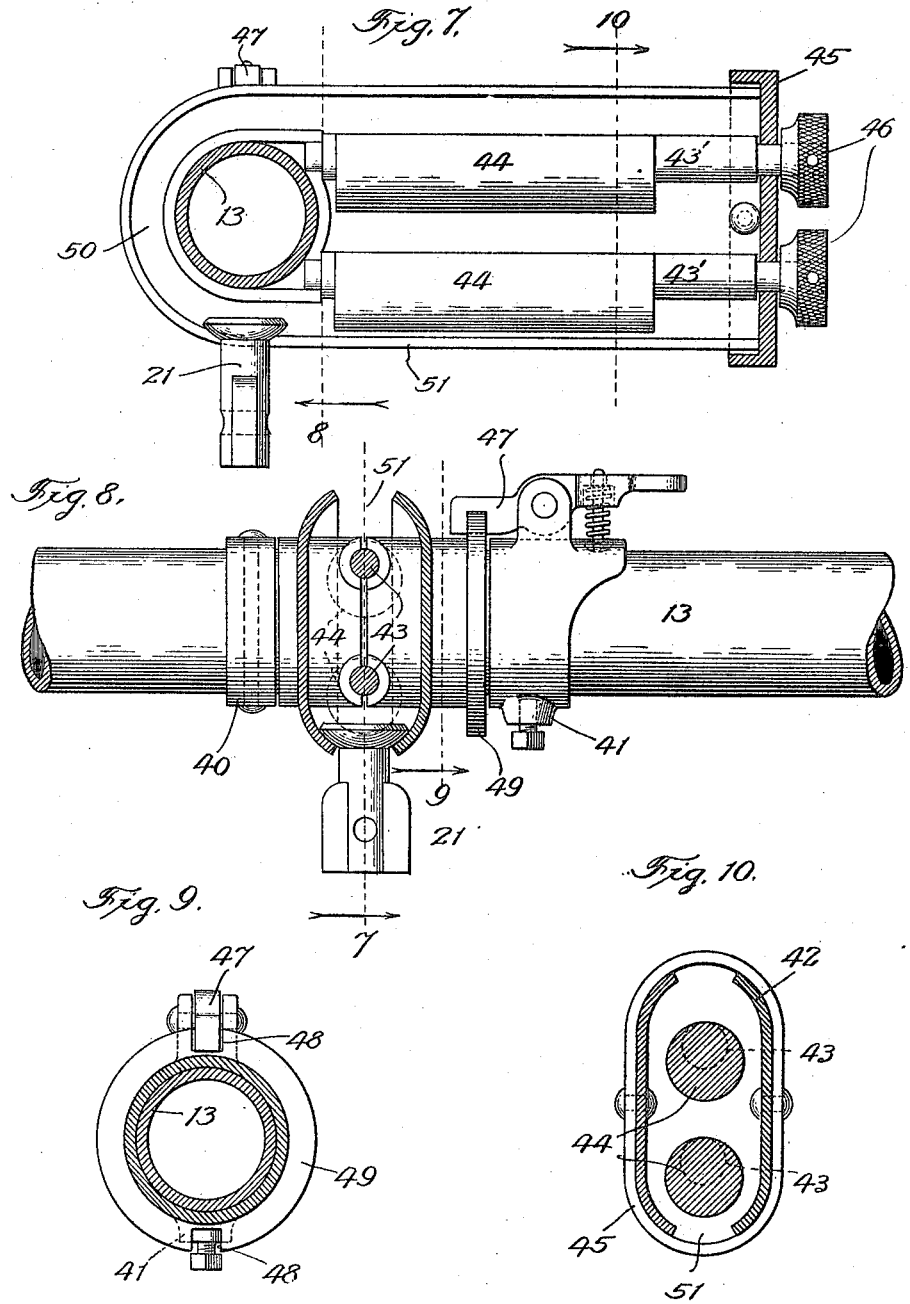

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

ANIMAL-STALL.

1,197,194.  Specification of Letters Patent.  Patented Sept. 5, 1916.

Application filed May 4, 1916.   Serial No. 95,433.

*To all whom it may concern:*

Be it known that I, HENRY L. FERRIS, a citizen of the United States, residing at Harvard, in the county of McHenry and State of Illinois, have invented a new and useful Improvement in Animal-Stalls, of which the following is a specification.

My invention relates to certain improvements in animal stalls, and is particularly directed to that class of stall illustrated and described in my prior Patent No. 1,172,236, of February 15, 1916.

The present invention will be more fully understood from the following detailed description thereof.

In this description reference will be had to the accompanying drawings, in which—

Figure 1 is a longitudinal section through a stall; Fig. 2 is an elevation of the upper end of the stall-frame showing the stanchion hung therein; Fig. 3 is an enlarged section on the line 3 of Fig. 2; Fig. 4 is a section on the line 4 of Fig 3; Fig. 5 is a section on the line 5 of Fig. 3; Fig. 6 is a section on the line 6 of Fig. 3; Fig. 7 is a section similar to Fig. 3 on the line 7, Fig. 8, but showing a modified form of pivoted track; Fig. 8 is a section on line 8 of Fig. 7; Fig. 9 is a section on line 9 of Fig. 8, and Fig. 10 is a section on line 10 of Fig. 7.

Referring more particularly to Figs. 1 to 6 of the drawings, the numeral 10 designates the base or foundation of the stall, which base will preferably be constructed of concrete molded to provide a curbing 11 at the front end, and a gutter 12 at the rear end. Supported in the curb 11 there is a vertical arch 13, which forms the front of the stall frame and is supported by the stall partition members 14, which themselves are supported at their rear ends in the base 10.

Centrally mounted on the top bar of the vertical arch 13 there is a two-piece casting 15 having an enlarged circular head 16 provided with a deep internal groove 17. In the assembled position of the parts the groove 17 receives the flange of a circular head 18, which is preferably cast integral with a tubular guide or track 19. The track 19 has a longitudinal slot 20 in its lower side within which rides a swivel pin 21 upon which is hung the stanchion 22. Extending longitudinally of the track 19 is a locking rod 23 having eccentric portions 24 thereon of such size as to engage the head of the swivel pin 21 when in the position shown in Fig. 3. The locking rod is held in a central position within the tubular track, and is designed to be operated by cap-members in the form of hand-wheels 25, 26, of the form shown in the drawing. The hand-wheel 26 at the outer end of the tubular guide preferably overhangs the cylindrical surface of the latter, and has its overhanging portion provided with an arcuate recess 27 which extends over substantially 180° of the circumference of the wheel. A rivet 28 secured in the end of the track-member 19 coöperates with the groove 27 to form stop mechanism by which the turning movement of the hand-wheels and of their connected locking rod 23 is limited to the 180° movement permitted by the slot 27.

The flanged head 18 of the track 19 is provided with a plurality of recesses 29 for coöperating with the head 16 to lock the track in any angular position with reference to the casting 15, the latter carrying a counterweighted bell-crank 30, the inner end of which passes through a slot in the head 16, and enters the recess 29 in the flange of the head 18.

It will be understood that the form of stall above described is particularly intended for use in relatively large installations, that is installations for handling a relatively large herd of animals, such as dairy cows. Under such conditions it is of importance that the animals in the stalls should be properly alined with the gutters, in order that they may be kept in a sanitary condition, and where, as is customary, the herd of animals is introduced into the stalls indiscriminately, it therefore becomes necessary to adjust each individual stall to suit the animal occupying the same. My invention is especially designed for this service.

As the animal enters the stall, the attendant will close the stanchion 22 upon its neck, and simultaneously will adjust the stanchion inwardly or outwardly to properly aline the animal with reference to the gutter. Such adjustment of the stanchion is effected by means of the pivoted track 19. By reference to Fig. 3 it will be seen that the swivel pin 21 from which the stanchion is hung, may occupy any one of three positions along the length of the track, being held in any predetermined position by the eccentrics 24. To shift the stanchion from one position to another it is only required to rotate one of the hand-wheels 25, 26, as is most convenient, to swing the eccentrics 24 out of the path of the head of the swivel 21, when the stanchion may be pushed in or out, the swivel traveling freely along the slot 20. When the proper position has been reached, the hand-wheel will be turned to bring the eccentrics back to the position shown in Fig. 3. It will be noted that the track-member 19 extends only to one side of the stall-frame 13, and for the position of the guide-memper illustrated it is therefore possible only to adjust the stanchion between the limits of the inner end of the guide and the center. In order to adjust the stanchion outwardly it is necessary to release the bell-crank 30 from its engagement with the recess 29 in the head 18, and swing the guide 19 bodily, the head 18 serving as a pivot. In general, the guide 19 would occupy the position shown in Figs. 1 and 3, or a position 180° away from this position. Under some special circumstances it might be desirable to adjust the stanchion laterally as well as longitudinally, and I therefore prefer to provide a plurality of the notches 29 in the head 18, so that the track or guide may be disposed in any desired angular relation to the stanchion.

The form of guide illustrated and described above is particularly advantageous, in that the guide-member or track itself need only be half the length of the total length of adjustment. For instance, in the case of cattle having horns, it is sometimes undesirable to have any part of the stall or stanchion connections in such a position that the horns of the cattle may catch upon the same. By my construction this desirable result is attained without sacrifice of the possibilities of wide adjustment.

In Figs. 7, 8, 9 and 10 I have illustrated a modified form of pivoting track or guide in which the latter swings in a vertical plane instead of in a horizontal plane. In the construction here illustrated the top bar of the arch 13 has fixed thereon a pair of spaced collars 40, 41, between which is journaled upon the bar a hollow casting 42, having a continuous slot 43 extending from one end around the pivoted portion and to the other end. Within this slot a mushroom headed swivel-pin 21 rides, this swivel-pin carrying the stanchion 22, as in the previous embodiment of my invention. Mounted parallel with one another and longitudinally of the hollow casting 42 there are locking rods 43, each provided with an eccentric portion 44 of such size as to form a stop for the head of the swivel 21. The locking rods 43 pass through a cap 45 which closes the open end of the casting 42, and are provided on their projecting ends with knurled thumb-wheels 46.

In order to maintain the guide-member or track 42 in the horizontal position either in front of or behind the stall-frame bar 13, the collar 14 which is mounted on the bar is provided with a spring-pressed lever 47, the end of which is adapted to engage in notches 48 formed in a flange 49 on the journal portion of the casting 42.

In the particular construction illustrated by Figs. 7 to 10, only three positions of adjustment of the stanchion with reference to the stall-front are provided. In the drawings, the swivel-pin 21, from which the stanchion hangs, occupies a central position. By turning the lower thumb-wheel 46 the eccentric 44 may be swung out of the path of the head of the swivel-pin to permit the latter to be pushed forward to the outer end of the housing, no intermediate position of adjustment being provided in this construction. For adjusting the stanchion in the opposite direction, it is necessary to release the lever 47 from its engagement with the notch 48 and swing the casting 42 bodily in a counter-clockwise direction about the bar 13, until after the movement of 180° the locking lever engages with the opposite notch 48. During this swinging movement the swivel-pin 21 will travel through the arcuate space designated 50 in Fig. 7, the slot 51 extending around this curved end.

While I have shown and described in considerable detail two specific embodiments of my invention, it is to be understood that these are illustrative only, and for the purpose of making the invention more clear, and that I do not regard the invention as limited to the particular form of construction illustrated, nor to any detail thereof, except in so far as such limitations have been included within the terms of the following claims, in which it is my intention to claim all novelty inherent in my invention as broadly as is permissible, in view of the prior art.

What I claim as new, and desire to secure by Letters Patent, is—

1. In combination, a rigid stanchion frame, a track-member pivoted thereto at one end, to swing in a plane running longitudinally of the stall, means for locking said track-member against rotation, a stanchion supported by said track-member, and means for securing said stanchion in adjusted positions along the length of the track.

2. In combination, a rigid stanchion frame, a track-member pivoted to said stanchion frame at one end for rotation thereabout in a plane running longitudinally of the stall, a stanchion, a stanchion-carrying member supported by said track, means for locking the stanchion-carying member in a variety of positions on the track, and means for locking the track in a variety of positions of angular adjustment.

3. In combination, a stall provided with a gutter, a hollow track-member, a stanchion, a stanchion-carrying member running in a slot in the track-member, an eccentric shaft lying within the track-member and extending longitudinally thereof, and an eccentric carried by said shaft and adapted when in one position to serve as a stop to prevent movement of said stanchion-carrying member.

4. In combination, a stall provided with a gutter, a hollow track-member pivoted thereto at one end for rotation in a plane extending longitudinally of the stall, means for securing said track-member in a variety of positions of angular adjustment, an eccentric shaft lying within the track-member and extending longitudinally thereof, an eccentric carried by the said shaft, and a stanchion-carrying member running in a slot in the guide and adapted to contact with said eccentric in one position of the latter.

5. In combination, a stall provided with a gutter, a rigid stanchion frame, a track-member pivoted at one end to said frame for rotation in a horizontal plane, means for securing said track-member in a variety of positions of angular adjustment, a stanchion-carying member supported by the said track for movement therealong, and means for locking the stanchion-carrying member in a variety of positions along the track.

6. In combination, a stall provided with a gutter, a rigid stanchion frame, a track-member pivoted at one end for rotation in a plane extending longitudinally of the stall, means for locking said track-member in a variety of positions of angular adjustment, a stanchion, a stanchion-carrying member supported by the said track for movement thereabout, and self-closing means for locking the stanchion-carrying member in a variety of positions along the track, both of said locking means being adapted to release and lock quickly to permit the adjustment of the parts while an animal is held by the stanchion.

HENRY L. FERRIS.

Copies of this patent may be obtained for five cents each, by addressing the "Commissioner of Patents, Washington, D. C."